United States Patent [19]

Newman et al.

[11] Patent Number: 4,688,228
[45] Date of Patent: Aug. 18, 1987

[54] PHASE LOCKED DIELECTRIC RIDGE GAS LASER

[75] Inventors: Leon A. Newman, South Windsor; Anthony J. DeMaria, West Hartford, both of Conn.

[73] Assignee: United Technologies Corporation, Hartford, Conn.

[21] Appl. No.: 762,899

[22] Filed: Aug. 6, 1985

[51] Int. Cl.$^4$ .................... H01S 3/098; H01S 3/03
[52] U.S. Cl. .................................. 372/18; 372/64
[58] Field of Search ................ 372/18, 61, 62, 64

[56] References Cited

U.S. PATENT DOCUMENTS 4,103,255  7/1978  Schlossberg .................. 372/61
4,367,554  1/1983  Schlossberg .................. 372/61

OTHER PUBLICATIONS

D. G. Youmans, "Phase Locking of Adjacent Channel Leaky Waveguide $CO_2$ Lasers", *Applied Physics Letters*, vol. 44, No. 4, Feb. 15, 1984, pp. 365-367.

V. J. Corcoran and I. A. Crabbe, "Electronically Scanned Waveguide Laser Arrays", *Applied Optics*, Aug. 1974, vol. 13, No. 8, pp. 1755-1759.

Jose E. Ripper and Thomas L. Paoli, "Optical Coupling of Adjacent Stripe-Geometry Junction Lasers", *Applied Physics Letters*, vol 17, No. 9, pp. 371-373.

D. R. Scifres, R. D. Burnham, and W. Streifer, "Phase--Locked Semiconductor Laser Array", *Applied Physics Letters*, vol. 33, No. 12, Dec. 15, 1978, pp. 1015-1017.

D. R. Scifres, R. D. Burnham, and W. Streifer, "High Power Coupled Multiple Stripe Quantum Well Injection Lasers", *Applied Physics Letters*, vol. 41, No. 2, Jul. 15, 1982, pp. 118-120.

D. Scifres, R. D. Burnham, W. Streifer, and M. Bernstein, "Lateral Beam Collimation of a Phased Array Semiconductor Laser", *Applied Physics Letters*, vol. 41, No. 7, Oct. 1, 1982, pp. 614-616.

E. Kapon, J. Katz, C. Lindsey, S. Margalit, and A. Yariv, "Control of Mutual Phase Locking of Monolithically Integrated Semiconductor Lasers", *Applied Physics Letters*, vol. 43, No. 5, Sep. 1, 1983, pp. 421-423.

J. Katz, S. Margalit and A. Yariv, "Diffraction Coupled Phase-Locked Semiconductor Laser Array", *Applied Physics Letters*, vol. 42, No. 7, Apr. 1, 1983, pp. 554-556.

W. T. Tsang, R. A. Logan, and R. P. Salathe, "A Densely Packed Monolithic Linear Array of GaAs-AlGa As Strip Buried Heterostructure Laser", *Applied Physics Letters*, vol. 34, No. 2, Jan. 15, 1979, pp. 162-165.

D. E. Ackley and R. W. H. Engelmann, "High-Power Leaky-Mode Multiple-Stripe Laser", *Applied Physics Letters*, vol. 39, No. 1, Jul. 1, 1981, pp. 27-29.

*Primary Examiner*—Gene Wan
*Attorney, Agent, or Firm*—Eric W. Petraske; J. Kevin Grogan

[57] ABSTRACT

A phase locked ridge waveguide gas laser comprises a plurality of resonators formed in a ceramic body. The resonators are delineated by ridges which provide less than total separation therebetween and allow optical coupling between guided mode optical signals propagating therein.

19 Claims, 9 Drawing Figures

PHASE LOCKED DIELECTRIC RIDGE GAS LASER

The Government has rights in this invention pursuant to Contract No. F49620-84-C-0062 awarded by the Department of the Air Force.

TECHNICAL FIELD

This invention relates to waveguide lasers and more particularly to $CO_2$ waveguide lasers having an array of phase locked resonators.

BACKGROUND ART

The advent of the waveguide gas laser allows the fabrication of more compact lasers. Narrowing the bore of the discharge tube provides increased gain, power generated per unit volume and saturation parameter. This increase in power is achieved even though linear gas waveguides leak radiation into the walls of the dielectric because of the existence of well defined, low loss modes of laser propagation. The performance enhancement results from favorable de-excitation of the gas by wall collisions, device operation at increased gas pressure, and by reduction in gas temperature due to the improved thermal conduction provided by the waveguide walls.

In an effort to further increase output power, several improvements have been developed. One device presented by H. R. Schlossberg in U.S. Pat. No. 4,367,554 of Jan. 4, 1983 has increased output power by employing a plurality of hollow dielectric channels within a chamber containing a $CO_2$ gas mixture. The diameter of the individual dielectric channels must be selected such that each channel is incapable of sustaining a guided mode of propagation, and be fabricated with an optically leaky dielectric. Only the multiplicity of leaky channels in combination provides sufficient gain for lasing within a device that comprises the totality of channels.

Another technique which has been used to increase the output power of gas lasers is to provide a mechanism for phase locking one laser relative to another, either by injection locking or optical coupling techniques. Phase locking maintains spatial coherence between the individual resonators.

Injection locking of adjacent lasers is accomplished by feeding the output of a single laser into a parallel array of optical resonators which act as amplifiers. If the lengths of the different optical paths are adjusted properly, the phase of the amplifier's output would be constant. Although this technique will provide phase locking and increased power, it mandates the use of external optical assemblies, such as mirrors and mounts, all of which must be precisely adjusted and which are subject to environmental degradation.

Another effective technique of providing phase locking is through optical coupling of adjacent lasers. Phase locked operation of adjacent lasers by optical coupling has been demonstrated in both waveguide gas lasers and semiconductor lasers. However, the physics which describe semiconductor lasers differ substantially from that which describes waveguide gas lasers. Semiconductor lasers are characterized by a guiding region whose index of refraction is greater than the surrounding cladding material. Waveguide gas lasers possess a guiding region having an index of refraction much less than the surrounding material.

Optical coupling in the two types of lasers occurs from two entirely different mechanisms. Semiconductor lasers couple as a result of the existence of an evanescent portion of the guided optical field in one resonator being present in another closely proximate resonator. Optical coupling between adjacent waveguide gas lasers cannot be by evanescent field coupling, but can only result from optical radiation loss or "leaks" between adjacent lasers. Consequently, techniques used to optically couple semiconductor lasers have limited applicability with waveguide gas lasers.

The optically coupled waveguide gas lasers of the prior art of one type comprise an elongated chamber that is divided into a plurality of longitudinal waveguides by using partitions made from an optically transmitting dielectric material. Prior art lasers of this type are excited by conventional DC or RF discharge that is provided to each optical resonator. The optically transmissive dielectric provides a lossy boundary through which energy leaks from one resonating cavity to the next, effectively coupling the phases and changing the amplitude distribution of the waveguide modes.

Coupled waveguide gas lasers of the prior art provide for increased power and phase locking. However, these devices are expensive to fabricate because of the dielectric array contained within the chamber. In addition, the amount of energy which "leaks" from one cavity to the next is limited to relatively small levels because of the high reflectivity of the transmitting material at the obligue angles of incidence which characterize mode propagation in waveguides. This in turn limits the operating parameters under which stable phase locked operation can be achieved.

Optically transmitting dielectric materials absorb power to some extent and reduce the overall amount of power available to the laser. It is well known in the art that employing a lossy dielectric separation between resonators will favor the "antisymmetric" phased locked normal mode of operation. This mode of operation is undesirable for most applications because the laser output beam possesses a power null across the optic axis. Moreover, the compartmentalized design of these lasers burdens them with poor thermal conductivity and undesirable gas flow characteristics. It is difficult to obtain optically transmitting materials in the infrared that are also good heat conductors for carrying away the heat generated by the electrical power dissipated in the laser's plasma column.

Initiating and sustaining a discharge in the resonator regions is difficult. With either DC or RF excitation the resonator ridge geometry produces a higher electric field strength within the gap above the ridges than in the resonators. Consequently, coupled ridge waveguide gas lasers of the prior art prevent gas breakdown in the gap and limit the discharge to the resonator regions. The additional apparatus needed to confine the discharge entails using additional components resulting in higher costs.

DISCLOSURE OF INVENTION

An object of the present invention is to provide an improved phase locked ridge waveguide gas laser. Another object of the present invention is to provide a ridge waveguide optical phased array gas laser having directional control of a phase locked optical signal therefrom. A further object of the present invention is to provide a phase controlled ridge waveguide gas laser having environmental compensation.

According to the present invention, a phase locked ridge waveguide gas laser contained within a housing comprises a ceramic body that has a cavity having a length, width and depth formed therein. A gas whose composition is selected to enable lasing operation at a desired wavelength is contained within the cavity. An electrical discharge in the gas is provided by a radio frequency excitation circuit. Mirrors are positioned relative to the housing to provide optical feedback, reflecting optical energy produced in the electrical discharge and provide lasing therein. The phase locked ridge waveguide gas laser also includes a ridge that is located within the cavity which forms a plurality of resonators each of which provide a guided mode optical signal therein. The ridge provides less than total separation between each of the resonators enabling optical energy to leak between the resonators, resulting in phase locking of the guided mode optical signals.

According to another aspect of the present invention, a ridge waveguide optical phased array gas laser responsive to an external signal contained within a housing comprises a ceramic body that has a cavity with a length, width and depth formed therein and a gas contained in the cavity whose composition is selected to enable lasing at a desired wavelength. The ridge waveguide optical phased array gas laser also includes a radio frequency excitation circuit which provides an electrical dischage in the gas as well as mirrors positioned relative to the housing to reflect optical signals from the optical discharge and provide lasing therein. Also included is a ridge within the cavity that forms a plurality of resonators for providing a guided mode optical signal in each of the resonators. The ridge provides less than total separation between the resonators enabling optical energy to leak between the resonators and provide phase locking of the guided mode optical signals. Moreover, the ridge waveguide optical phased array includes extra cavity modulation means responsive to an external signal which receives the guided mode optical signals and provides a phased delay therebetween, enabling directional control thereof.

In further accord with the present invention, a phase controlled ridge waveguide gas laser contained within a housing responsive to an external signal comprises a ceramic body that has a cavity with a length, depth and width formed therein and gas contained within the cavity whose composition is selected to provide lasing at the desired wave length. An electrical discharge within the gas is provided by a radio frequency excitation circuit and mirrors are positioned relative to the housing to reflect light from the optical discharge and provide lasing therein. The phase controlled ridge waveguide gas laser also includes a ridge within the cavity that forms a plurality of resonators providing a guided mode optical signal in each of the resonators. The ridge provides less than total separation between the resonators enabling optical energy to leak therebetween and provide phase locking of the guided mode optical signals. Also included is a gas density modulator responsive to the external signal which provides each of the resonators supplemental intra-resonator RF modulation for compensating environmentally induced variations in the resonators optical paths.

BEST MODE FOR CARRYING OUT THE INVENTION

Figure 1:
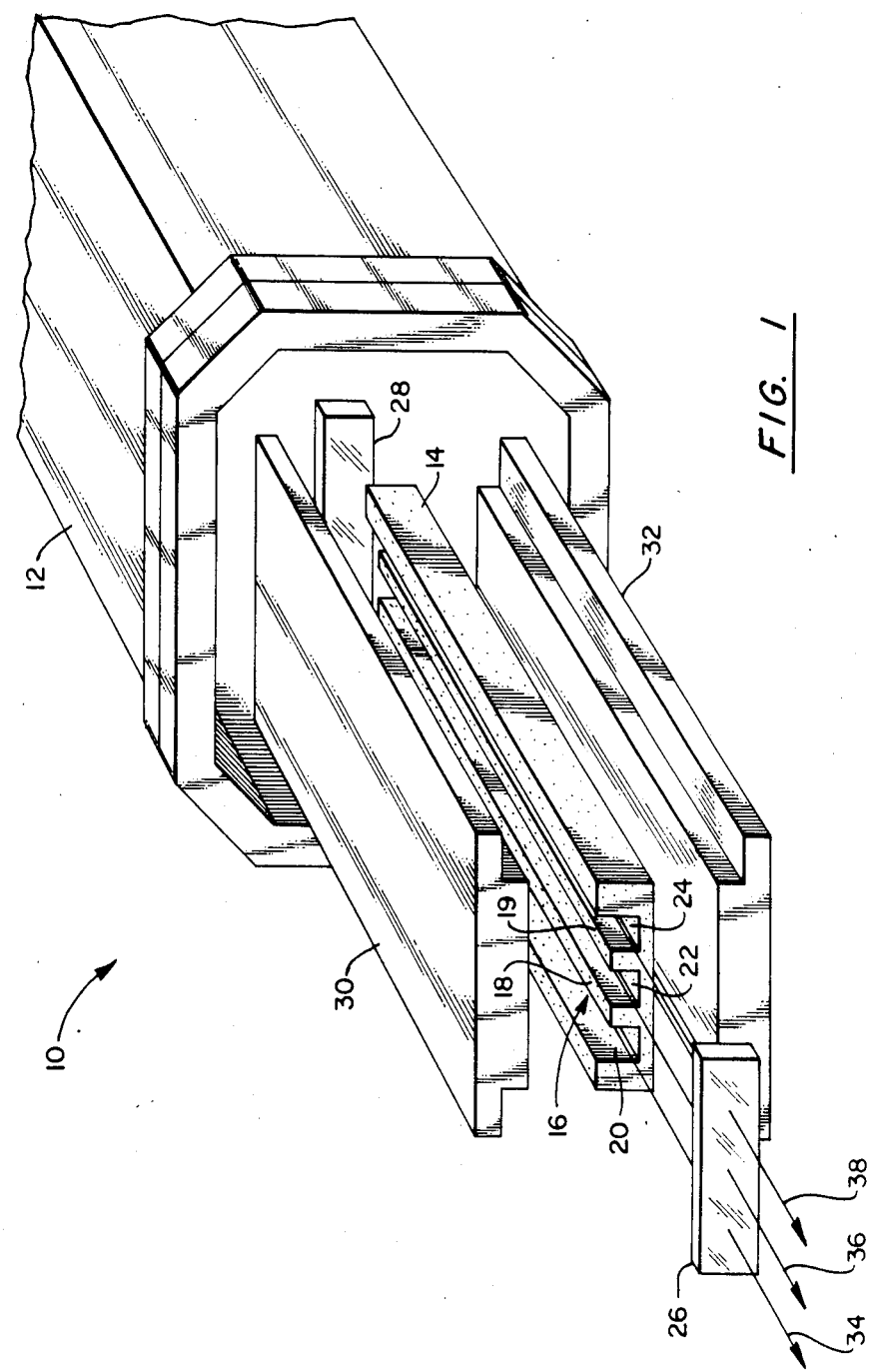
FIG. 1 is an exploded perspective illustration of a phase locked ridge waveguide gas laser provided according to the present invention.

Referring now to FIG. 1, in an exploded prespective illustration of a phase locked ridge waveguide gas laser provided according to the present invention, a phase locked ridge waveguide gas laser 10 comprises a housing 12 made from bakable aluminum or equivalent and contains a dielectric body 14 made from a ceramic material or equalivent having cavity 16 therein. The housing also includes end covers and a gas port in the housing (not shown) enabling the devices to be evacuated and back filled with a lasing gas that is also not illustrated.

Inside the cavity are longitudinal ridges 18, 19 formed in the ceramic body by conventional techniques which define three optical resonators 20, 22 and 24 as an example. As hereinafter detailed with respect to FIG. 2, the dimensions of the resonators must be selected to sustain lasing and to provide optical coupling between the resonators. In the best mode embodiment the length of the resonators is approximately 37 cm long, although other lengths may be substituted. The ceramic material selected to comprise the ceramic body can be of a type known in the art such as aluminum oxide ($Al_2O_3$) and in the best mode embodiment comprises beryllium oxide (BeO). Those skilled in the art will note that the ridges may comprise a different dielectric than the ceramic body and may equivalently be fabricated separate from the cavity and subsequently positioned therein.

Mirrors 26 and 28 are located by conventional techniques at either end of the ceramic body or within the end covers perpendicular to the resonators. They are made from conventional materials known in the art such as zinc selinide and are chosen to be reflective of a selected percentage of incident light at a selected wavelength.

The lasing gas is a conventional mixture, and in the best mode embodiment comprises a mixture of 4% Xenon, 12% carbon dioxide, 20% nitrogen and 64% helium by mole fraction at a pressure of 100 Torr. Those skilled in the art will note that other equivalent mixtures and pressures may be equivalently substituted.

Also included are radio frequency electrodes 30 and 32 which are of a conventional type and extend the length of the resonators. In the best mode embodiment the electrodes comprise copper or aluminum sheet at least 20μ thick for excitation at 145 MHz. If other excitation frequencies are substituted, the thickness of the electrode must be chosen to be greater than the skin depth. The electrodes are attached by conventional techniques to the ceramic body.

When assembled, the housing is evacuated and then filled with the lasing gas. Radio frequency excitation is provided to the RF electrodes via a conventional RF feedthrough in the housing (not shown) and produces an electrical discharge in the gas. As is well known in the art, proper selection of the optical parameters and gas pressures will result in lasing of the device. Guided mode optical signals 34, 36 and 38 will be produced in each of the resonators.

Although conventional radio frequency excitation may be employed, in the best mode embodiment the radio frequency excitation circuit comprises a distributed inductance parallel resonant radio frequency circuit as presented by Peter Chenausky et al in U.S. Pat. Nos. 4,363,126 and 4,443,877 assigned to the assignee hereof and incorporated by reference herein. The circuit provides approximately 500 watts at 145 MHz.

The RF field is developed in the capacitor formed by the ceramic body and the upper and lower RF electrodes. The circuit initiates and sustains a discharge in the resonator region of the housing. An external shunt inductance is provided to resonate the capacitance of the discharge structure. Conventional fifty ohm impedance RF power supplies can effectively be matched to the transverse discharge impedance load presented by the laser structure. By operating a few megahertz off of the center resonant frequency a point is reached where the real impedance equals fifty ohms. This is achieved by cancelling the reactive component of the discharge impedance at this frequency with a series reactance that is capacitive for low frequencies and inductive at high frequencies.

A problem develops as the length of the device is scaled and/or the frequency of the RF field is increased. A voltage variation develops along the length of the device because the electrical characteristics of the laser are distributed throughout its length resulting in a nonuniform discharge and reduced output per unit length. For example, at an operating frequency of 145 MHz and a device length of 37 cm, the high dielectric constant parallel electrode geometry will exhibit standing wave phenomena similar to those observed in a lossy transmission line. Analysis has revealed that if a distributed inductance comprising a multiplicity of discrete circuit inductors are used to resonate the laser, the voltage variations are essentially eliminated. In the best mode embodiment the inductors comprise discrete circuit elements (not shown) connected between the two RF electrodes. The spacing between the inductors should be much less than a quarter of the excitation wavelength to adequately approximate the distributed inductance. In the best mode embodiment the distributed parallel inductance has a magnitude of 10 nanohenrys and is comprised of at least ten coils on each side of the ceramic body.

The use of a parallel resonant radio frequency circuit as presented by the aforementioned Peter Chenausky patents and detailed hereinabove allow the construction of long phase locked ridge waveguide gas lasers operating at high frequencies which can be driven with a very simple single port RF connector.

Figure 2:
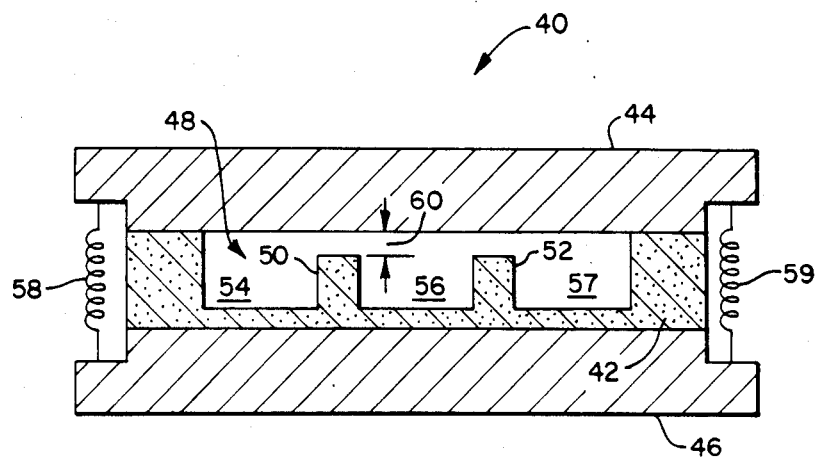
FIG. 2 is a sectioned illustration of a portion of the phase locked ridge waveguide gas laser of FIG. 1.

FIG. 2 is a sectioned illustration of a portion 40 of the phase locked ridge waveguide gas laser of FIG. 1. Ceramic body 42 is bounded by upper RF electrode 44 and lower RF electrode 46. Within cavity 48 are ridges 50 and 52 which form resonators 54, 56 and 57. The cavity and ridges formed in the ceramic housing are fabricated by techniques well known in the art. Also illustrated are discrete inductor coils 58 and 59 between the upper and lower RF electrodes located on either side of the ceramic body. The inductors comprise part of the distributed inductance parallel resonant circuit described hereinabove with respect to FIG. 1.

Although only two ridges creating three resonators are shown, those skilled in the art will note that fewer or greater numbers of resonators may be selected. Moreover, although only a linear array of parallel resonators is illustrated, those skilled in the art will recognize that other geometrical resonator configurations such as cylindrical or opposed linear array of parallel resonators may be similarly chosen.

The height of the ridges is selected to be less than the depth of the cavity so that there is less than total physical separation between resonators. Gap 60 exists between the upper RF electrode and the ridges enables optical energy to leak from one resonator to another. The amount of optical coupling between adjacent resonators is controlled by the gap dimension and width of the ridge which form the separation between resonators. In order to increase the amount of coupling between channels it is desirable to fabricate as small a separation as possible and as large a gap as possible. The separation is limited by material and fabrication constraints to be approximately ten thousandths of an inch for the rectangular resonator geometry illustrated in FIG. 2. The gap also allows the parallel electrical discharges in the resonators to couple to one another, thereby obtaining uniform discharges and good initiation of all discharges within the individual resonators.

In order to operate in the lowest order mode, the gap dimension must be less than or equal to one-half the cavity depth. In the best mode embodiment, the cavity depth is between 0.1 and 0.5 cm. The resonator width is between 0.1 and 0.5 cm, and the gap is between 0.19 and 0.5 times the cavity depth. Larger gap dimensions will result in multimode operation of the laser.

For efficient operation of the laser, it is necessary that an RF discharge be created in each of the resonators. When the RF excitation is applied, the field strength between the electrodes is much stronger in the gap region than in the resonator region. Those skilled in the art will note that gas breakdown will first occur within the gap region and will most probably be limited thereto. However, in the phase locked ridge waveguide gas laser provided according to the present invention, the dimensions of the ridge are selected to create a gap region discharge such that free electrons oscillating therein will make sufficient numbers of ionizing collisions with gas atoms within the resonators to initiate and sustain a discharge in the resonators adjacent to the ridge. In the best mode embodiment the ridge must have a width such that the separation between adjacent resonators is less than fifty thousandths of an inch, and in the best mode embodiment comprises approximately ten thousandths of an inch.

Figure 3:
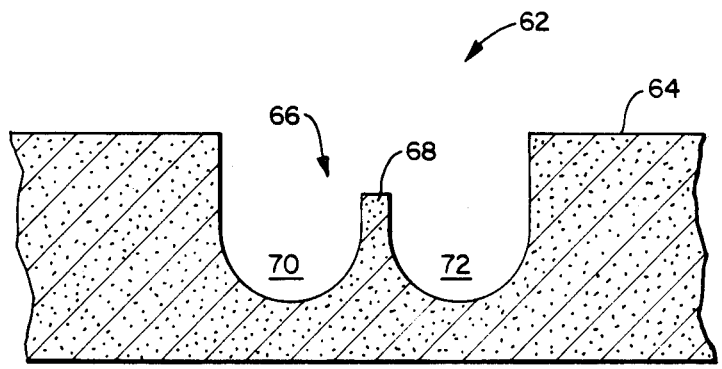
FIG. 3 is a sectioned illustration of a portion of an alternative embodiment of the phase locked ridge waveguide of FIG. 1.

FIG. 3 is a sectioned illustration of a portion 62 of an alternative resonator geometry for the phase locked ridge waveguide laser of FIG. 1. Ceramic body 64 has a cavity 66 with ridge 68 fabricated therein. The ridge extends longitudinally in the cavity to form two U-shaped resonators 70 and 72 having a cross section which approximately comprises a modified double concave geometry. Every other aspect thereof is the same as the phase locked ridge waveguide gas laser described hereinbefore with respect to FIG. 1.

As is well known in the art, the resonator geometry of waveguide gas lasers must be selected to enable guide mode propagation of an optical signal within the guide. According to the present invention, the function of the ridges is to provide a sufficiently lossy boundary between resonators to enable guided mode propagation therein, while proividing for as much optical coupling by radiation leakage as possible. Therefore, it is best to minimize the overall dimensions of the ridges themselves. Moreover, smaller ridge geometries allow for more compact laser designs and provide savings in material costs.

Ridges fabricated with rectangular cross sections must possess a certain minimum width or lose their structural integrity. Ceramic materials such as aluminum oxide or berryllium oxide cannot support ridges less than approximately 0.4 mm wide. Although conventional fabrication techniques can be used, ridges with rectangular geometries fabricated in ceramics require complex machinery and have high fabrication costs.

A design which provides more compact geometry and ease of fabrication is a U-shaped waveguide as provided by applicants' copending application entitled U CHANNEL WAVEGUIDE LASER, U.S. Ser. No. 529,438. A U-shaped resonator design mandates a modified double concave ridge cross sectional geometry for a phase locked ridge waveguide gas laser. The double concave ridge geometry is of superior strength because thicker walls at the base of the ridge allow for more narrow ridges to be fabricated. Ridges having a width as thin as 0.25 mm can be fabricated in this manner. The modified double concave ridge is more easily fabricated as it eliminates several machining steps needed to fabricate flat bottomed resonators.

Figure 4A:
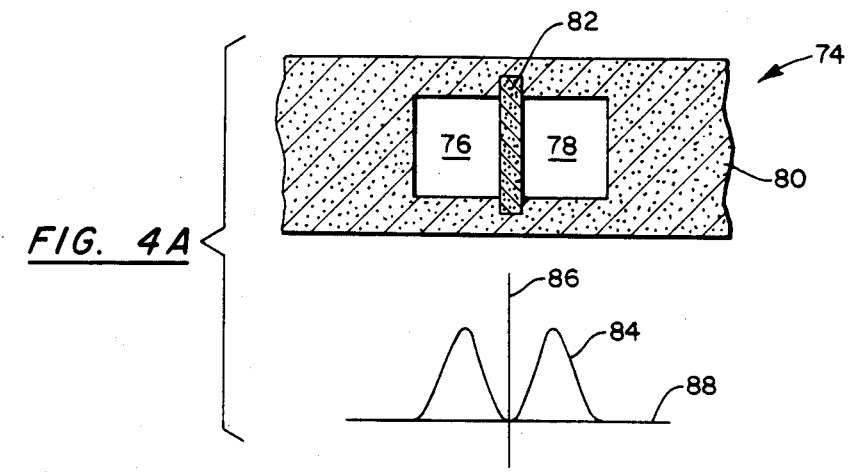
FIG. 4A is a sectioned illustration of a coupled waveguide gas laser of the prior art and a diagram of the intensity distribution of the optical field contained therein.

FIG. 4A illustrates a portion 74 of a coupled waveguide gas laser of the prior art comprising resonators 76 and 78 in ceramic body 80 seperated by a dielectric medium 82 which is transparent to the laser's radiation and includes a diagram of the intensity distribution of the optical field therein. The diagram contains curve 84 of the optical intensity and axis 86 indicating intensity magnitude and axis 88 denoting position across the section. Those skilled in the art will note that of the two normal modes that are possible for weakly coupled resonators (symmetric and antisymmetric) only the symmetric mode is shown, as it is the only mode where laser intensities are in phase and at a maximum. The presence of the dielectric between resonators requires the optical field intensity to diminish to approximately zero therein which favors the selection of the antisymmetric normal mode. Moreover, the loss provided by the dielectric robs the laser of optical power. In addition, it is difficult to obtain dielectrics with good optical transmission and good heat conductivity.

Figure 4B:
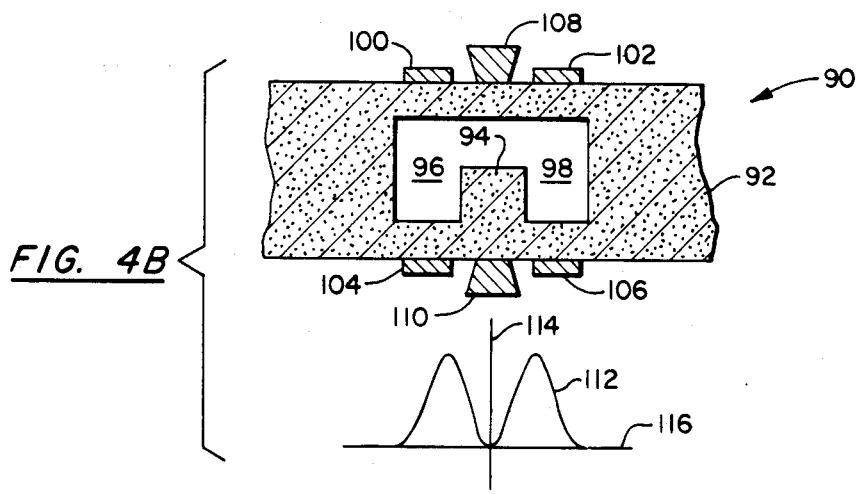
FIG. 4B is a sectioned illustration of a phase coupled ridge waveguide of the prior art and a diagram of the intensity distribution of the optical field contained therein.

FIG. 4B contains a sectioned illustration of a portion 90 of a phase locked ridge waveguide gas laser of the prior art and an intensity diagram of the optical field therein. The laser comprises ceramic body 92 with a ridge 94 fabricated therein forming resonators 96 and 98. Also included are a pair of upper RF electrodes 100, 102 and a pair of lower RF electrodes 104 and 106 as well as permanent magnets 108 and 110. The diagram has curve 112 of the optical intensity. Axis 114 indicates the intensity magnitude and axis 116 denotes position across the section.

Removal of some of the dielectric from between the resonators eliminates a source of optical power loss. However, those skilled in the art will note that the lack of dielectric between the resonators would allow the lasing gas to break down in the gap region rather than the resonators. The permanent magnets prevent gas breakdown within the gap and confine the plasma to the resonators.

As in the case of a somewhat lossy dielectric, the optical field intensity in the region between resonators must also approach zero because of the requirement that the discharge be contained within the resonator housing.

Figure 4C:
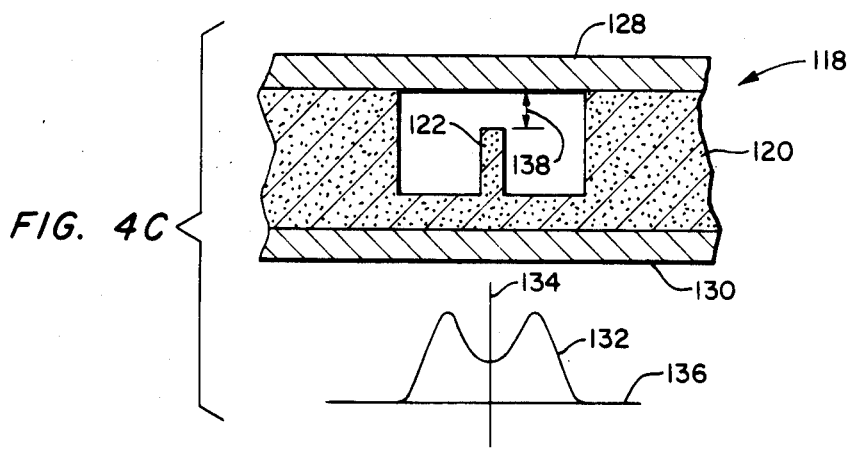
FIG. 4C is a sectioned illustration of a portion of a phase locked ridge waveguide gas laser provided according to the present invention and a diagram of the intensity distribution of the optical field contained therein.

FIG. 4C is a sectioned illustration of a portion 118 of a phase locked ridge waveguide gas laser provided according to the present invention including ceramic body 120 having a ridge 122 fabricated therein forming resonators 124 and 126. Also included are upper RF electrode 128, and lower RF electrode 130 and a diagram of the intensity of the optical field contained therein. The diagram, which illustrates the symmetric mode, contains curve 132 of the optical intensity, and axes 134 and 136 denote intensity magnitude and position across the laser section respectively.

Although only one ridge is illustrated, those skilled in the art will recognize that the representations of the optical field for the single ridge-two resonator configuration can be extended to multiple ridge/resonator configurations. In the best mode embodiment the resonator's physical parameters are selected to support only the symmetric mode of operation.

Examination of the intensity diagram of FIG. 4C reveals that the optical field intensity does not drop to zero in the gap region 138 between resonators. As described hereinabove, without dielectric material completely separating each resonator, a discharge will be sustained in both the resonators as well as the gap if the dimensional parameters of the ridge are properly selected. Those skilled in the art will note that the presence of the optical discharge in the gap region provides unexpected benefits and is therefore desirable. Besides operating as a source of ionizing electrons for the resonators, the lasing gas located in the gap regions is a source of optical power and contributes to the overall gain of the laser. Moreover, the presence of the lasing gas mixture which acts as the gain medium inhibits the operation of the laser in the undesirable antisymmetric normal mode. The phase locked ridge waveguide illustrated in FIG. 3 can also be used in the configuration illustrated in FIG. 4C.

Figure 5:
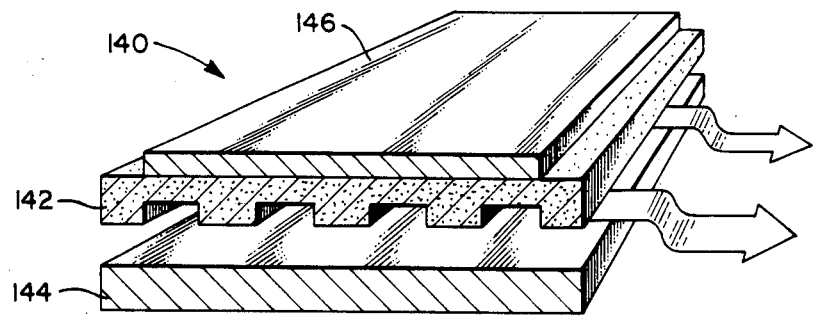
FIG. 5 is an illustration partially in section and partially in perspective of an alternative embodiment of a phase locked ridge waveguide gas laser of FIG. 1.

FIG. 5 is an illustration partially in perspective and partially in section of a portion of an alternative embodiment 140 of a phase locked ridge waveguide gas laser provided according to the present invention. Ceramic body 142 is fabricated such that a large volume of flowing lasing gas can be provided to the cavity in a continuous fashion. The body is bounded by lower RF electrode 144 and upper RF electrode 146. This configuration enhances the laser's operational capabilities in very high continuous duty applications and also has the advantage of providing convective cooling by the flowing gas in addition to conductive cooling provided by the ceramic dielectric material forming the ridged waveguides. Moreover, discharge produced gas constituents which may be detrimental to the operation of the laser can be quickly removed. Housing, end covers, mirrors, and radio frequency excitation circuitry which comprise this alternative embodiment have not been illustrated and correspond to those elements described hereinbefore with respect to FIG. 1.

Figure 6:
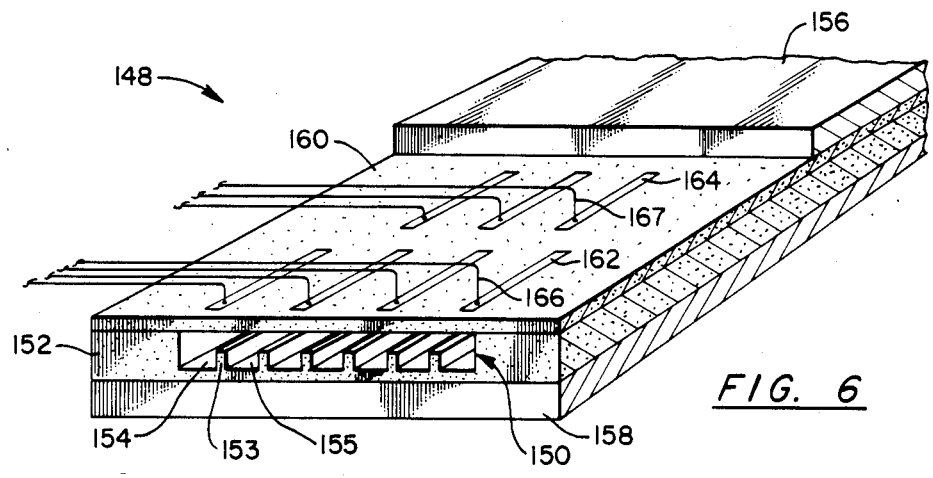
FIG. 6 is an illustration partially in section and partially in perspective of a phase controlled ridge waveguide gas laser provided according to the present invention.

FIG. 6 is an illustration partially in section and partially in perspective of a portion of a phase controlled ridge waveguide gas laser 148 provided according to the present invention. Cavity 150 is formed within ceramic body 152 and has a plurality of ridges which define a plurality of resonators therebetween, of which ridge 153 separating resonators 154 and 155 are examples. Upper RF electrode 156 which extends less than the resonator length provides radio frequency excitation in conjunction with lower electrode 158. Also included is ceramic cover 160 positioned on top of the ceramic body enclosing the cavity. Not shown in FIG. 5 are a metal housing and end covers which enclose the ceramic body and RF electrodes and are exactly analogous to corresponding metal housing and end covers described with respect to FIG. 1. Unless indicated herein, the materials and structures which comprise the laser described with respect to FIG. 6 are identical to those corresponding materials and structures described with respect to FIG. 1.

In addition, for each of the plurality of resonators there exists discrete RF electrodes that are individually responsive to external signals provided thereto, of which electrodes 162 and 164 and corresponding lines 166 and 167 are examples. In the best mode embodiment the discrete RF electrodes comprise copper strips approximately 0.2 cm wide by 2 cm long and 20$\mu$ in thickness deposited by conventional techniques on the ceramic cover. The additional radio frequency field provided by the supplemental electrodes causes a change in the plasma density of the gas contained in the resonators. Since the plasma density is related to the index of refraction, changing the local plasma density will produce a change in the effective optical path length of each of the resonators.

It is well known in the art that the phase and frequency of oscillation within the resonator is a function of the optical path length. Moreover, optically coupled resonators will phase lock only if all the resonators are within a narrow range of optical path lengths. Substantial variations in the optical path length of the resonators can be traced to several causes, especially environmental parameters such as thermal stresses for the phase controlled ridge waveguide provided according to the present invention. In the best mode embodiment the optical path length difference between resonators should be less than 10% of the lasing wavelength in order to phase lock the guided mode optical signals therefrom.

The discharge intensity modulation provided by the supplemental RF electrodes are responsive to external signals and allow for optical path length compensation to be externally introduced. The phase adjustment provided by the variable optical path of each resonator will ensure phase locked operation of the laser.

Figure 7:
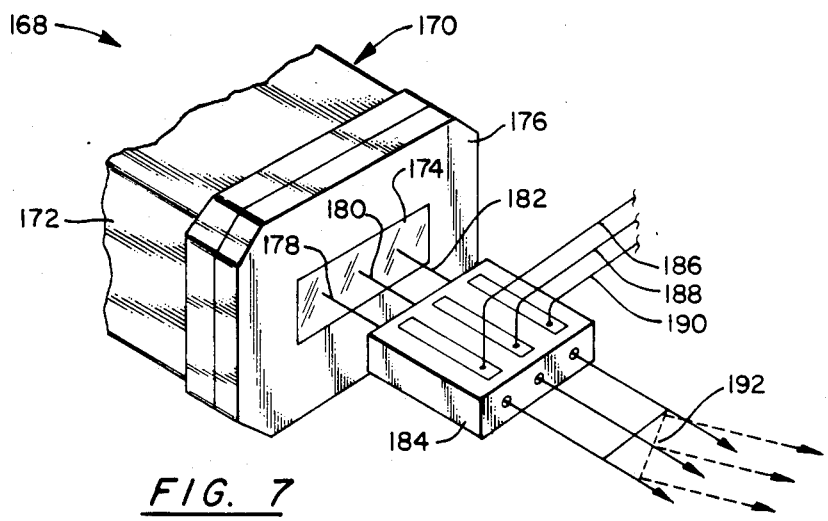
FIG. 7 is a perspective illustration of a ridge waveguide optical phased array gas laser provided according to the present invention.

FIG. 7 is an illustration partially in section and partially in perspective of a ridge waveguide optical phased array gas laser 168 responsive to an external signal that is provided according to the present invention. The ridge waveguide optical phased array comprises phase locked ridge waveguide gas laser 170 including metal housing 172 and mirror 174 mounted within end cover 176. Not illustrated in FIG. 6 is a complementary end port which encloses a ceramic body having longitudinal ridges and RF electrodes that are exactly analogous to corresponding components of a phase locked ridge waveguide gas laser described with respect to FIG. 1.

The output signals of the phase locked ridge waveguide gas laser comprises guided mode optical signals 178, 180 and 182, all having the same phase. These signals are input into extra cavity phase modulator 184 which comprises a parallel array of cadmium telluride or equivalent conventional phase modulators, each of which receive a guided mode optical signal.

The phase modulators are responsive to external signals provided on lines 186, 188 and 190 provided by a control signal processor not shown and not part of the present invention. Due to the identical phase of the input guided mode optical signals, a slight perturbation to the optical path length thereof by the phase modulators will result in a tilting or change in direction of the phase front of the phase modulator output singnal 192.

Similarly, although the invention has been shown and described with respect to a best mode embodiment thereof, it should be understood by those skilled in the art that various other changes, omissions and additions thereto may be made therein, without departing from the spirit and scope of the invention.

We claim:

1. A phase locked ridge waveguide gas laser contained within a housing, comprising:
   ceramic body means having a cavity with a length, width and depth formed therein;
   gas lasing means contained within said cavity;
   excitation means disposed on said ceramic body means for providing radio frequency excitation of said gas lasing means producing an electrical discharge therein;
   mirror means positioned relative to said housing means so as to provide lasing of said electrical discharge; and
   ridge means located with said cavity, extending along said length and forming therein a plurality of laser resonators providing a guided mode optical signal in each of said resonators, said ridge means further providing less than total separation between said resonators, thereby forming a gap extending over at least a portion of said length and providing a direct path in said gas lasing means between said plurality of laser resonator, for phase locking said guided mode optical signals; and
   said excitation means includes an electrode extending over said ridge means, whereby said radio frequency excitation extends into said gap.

2. The phase locked waveguide gas laser of claim 1, wherein said gas lasing means comprises a gas mixture of approximately 65% helium, 22% nitrogen and 13% carbon dioxide by mole fraction.

3. The phase locked waveguide gas laser of claim 1, wherein said ceramic body means comprises $Al_2O_3$.

4. The phase locked ridge waveguide gas laser of claim 1, wherein said radio frequency excitation means comprises a distributed inductance parallel resonant radio frequency circuit.

5. The phase locked ridge waveguide gas laser of claim 1, wherein said ridge means comprises a plurality of longitudinal partitions equally spaced across said cavity width having a cross sectional area perpendicular to said cavity length and having a height between 0.8 and 0.5 times said cavity depth.

6. The phase locked ridge waveguide gas laser of claim 5, wherein said cross sectional area comprises a rectangle.

7. The phase locked ridge waveguide gas laser of claim 5, wherein said cross sectional area comprises a modified double concave surface.

8. A ridge waveguide optical phased array gas laser responsive to an external signal contained within a housing, comprising:
   ceramic body means having a cavity with a length, width and depth formed therein;
   gas lasing means contained within said cavity;
   excitation means disposed on said ceramic body means for providing radio frequency excitation of said gas lasing means producing an electrical discharge therein;
   mirror means positioned relative to said housing means so as to provide lasing of said electrical discharge;
   ridge means located with said cavity, extending along said length and forming therein a plurality of laser resonators providing a guided mode optical signal in each of said resonators, said ridge means further providing less than total separation between said resonators, thereby forming a gap extending over at least a portion of said length and providing a direct path in said gas lasing means between said plurality of laser resonator, for phase locking said guided mode optical signals; in which said excitation means includes an electrode extending over said ridge means, whereby said radio frequency excitation extends into said gap; and
   extra cavity phase modulation means responsive to the external signal for receiving said guided mode optical signals and providing thereto a phase delay therebetween.

9. The ridge waveguide optical phased array of claim 8, wherein said gas lasing means comprises a gas mixture of approximately 65% helium, 22% nitrogen and 13% carbon dioxide by mole fraction.

10. The ridge waveguide optical phase array of claim 8, wherein said ceramic body means comprises aluminum oxide $Al_2O_3$.

11. The ridge waveguide optical phased array of claim 8, wherein said radio frequency excitation means comprises a distributed inductance parallel resonant radio frequency circuit.

12. The ridge waveguide optical phased array of claim 8, wherein said extra-cavity modulation means comprises a cadmium telluride crystal (CdTe).

13. The ridge waveguide optical phased array of claim 8, wherein said ridge means comprises a plurality of longitudinal partitions equally spaced across said cavity width having a cross sectional area perpendicular to said cavity length and having a height between 0.8 and 0.5 times said cavity depth.

14. The ridge waveguide optical phased array of claim 13, wherein said cross sectional area comprises a rectangle.

15. The ridge waveguide optical phased array of claim 13, wherein said cross sectional area comprises a modified double concave surface.

16. A phase controlled ridge waveguide gas laser responsive to an external signal contained within a housing, comprising:
   ceramic body means having a cavity with a length, width and depth formed therein located within the housing;
   gas lasing means contained within said cavity;
   excitation means disposed on said ceramic body means for providing radio frequency excitation of said gas lasing means producing an electrical discharge therein;
   mirror means positioned relative to said housing means so as to provide lasing of said electrical discharge;
   ridge means located with said cavity, extending along said length and forming therein a plurality of laser resonators providing a guided mode optical signal in each of said resonators, said ridge means further providing less than total separation between said resonators, thereby forming a gap extending over at least a portion of said length and providing a direct path in said gas lasing means between said plurality of laser resonator, for phase locking said guided mode optical signals; (and) in which said excitation means includes an electrode extending over said ridge means, whereby said radio frequency excitation extends into said gap; and
   discharge intensity modulation means responsive to the external signal for providing each of said resonators supplemental intra-resonator radio frequency modulation.

17. The phase controlled ridge waveguide gas laser of claim 16, wherein said ridge means comprises a plurality of longitudinal partitions equally spaced across said cavity width having a cross sectional area perpendicular to said cavity length and having a height between 0.8 and 0.5 times said cavity depth.

18. The phase controlled ridge waveguide gas laser of claim 17, wherein said cross sectional area comprises a rectangle.

19. The phase controlled ridge waveguide gas laser of claim 17, wherein said cross sectional area comprises a modified double concave surface.

\* \* \* \* \*